(12) United States Patent
Srivastava

(10) Patent No.: US 9,628,124 B1
(45) Date of Patent: Apr. 18, 2017

(54) SENSOR SIGNALS INTERFERENCE MITIGATION METHOD AND APPARATUS

(71) Applicant: Intel Corporation, Santa Clara, CA (US)

(72) Inventor: Amit Kumar Srivastava, Penang (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/239,742

(22) Filed: Aug. 17, 2016

(51) Int. Cl.
*H04B 5/00* (2006.01)
*H04B 1/10* (2006.01)
*H04W 4/00* (2009.01)

(52) U.S. Cl.
CPC .......... *H04B 1/1036* (2013.01); *H04W 4/005* (2013.01); *H04B 2001/1072* (2013.01)

(58) Field of Classification Search
CPC .... H04B 17/21; H04B 17/373; H04B 1/1036; H04B 2001/1072; H04B 5/0037; H04B 5/00; H04B 17/309; H04W 4/005; H04W 4/008; H04W 12/08; H04W 76/02; H04W 84/18; H04L 67/12
See application file for complete search history.

(56) References Cited

U.S. PATENT DOCUMENTS

| 9,059,768 | B1* | 6/2015 | Sorsby | H04B 1/123 |
| 2005/0226353 | A1* | 10/2005 | Gebara | H04B 1/1036 375/346 |
| 2010/0136926 | A1* | 6/2010 | Lackey | H04B 1/525 455/78 |
| 2013/0210346 | A1* | 8/2013 | Ling | H04W 4/008 455/41.1 |
| 2015/0215937 | A1* | 7/2015 | Khandani | H04W 76/02 370/277 |
| 2016/0254840 | A1* | 9/2016 | Abdelmonem | H04L 5/0026 375/148 |

\* cited by examiner

*Primary Examiner* — Thanh Le
(74) *Attorney, Agent, or Firm* — Schwabe, Williamson & Wyatt, P.C.

(57) ABSTRACT

Embodiments of the present disclosure provide techniques and configurations for an apparatus for mitigating interference in sensor signals. In one instance, the apparatus may include sensors and a processing block couplable with the sensors. The processing block may include a front end block to receive sensor signals, and tunable filter block to filter the sensor signals. The apparatus may further include a correction block. The correction block may include a replica of the front end block, and may be configured to receive interference information. A controller may operate the correction block to adjust the tunable filter block, based on interference information, and connect the sensors with the processing block after adjustment. The controller may operate the processing block, in response to connection of the processing block with the sensors, to initiate processing of sensor signals filtered by the filter block, to mitigate interference. Other embodiments may be described and/or claimed.

22 Claims, 4 Drawing Sheets

SENSOR SIGNALS INTERFERENCE MITIGATION METHOD AND APPARATUS

FIELD

Embodiments of the present disclosure generally relate to the field of sensor devices, and more particularly, to mitigating interference of signals from sensors, such as analog sensors.

BACKGROUND

Sensors, such as analog sensors, are widely used in various applications, such as smartphones, tablet computers, laptops, Internet of Things (IoT), and other portable or wearable devices. Some of the sensors may be used to monitor device-related or human body-related events like physical activity, gestures, speech, health, emotional state, etc. The performance of these sensors, in particular, signals obtained from them, may depend on their sensitivity toward electromagnetic interference (EMI). In some instances, such as for IoT devices or biosensing devices, the sensed signals provided by the sensors, as a result, the data provided, may be distorted or corrupted by EMI. The signal corruption may occur because many sensors, in particular, analog sensors, may be prone to interference (signal to interference ratio) of 0 dB to −10 db or beyond for the in-band frequency range, and also for the out-of-band frequency range noise. For example, an audio sensor may operate at a signal amplitude of 1 mV to 10 mV for a frequency range from 20 Hz to 20 KHz. In another example, medical implanted devices may operate in the frequency range of 1 KHz to 10 MHz and signal amplitude in the range of 10 uV to 10 mV. Filtering interference in these frequency bands may require higher order filtering, which may result in increased bill of materials (BOM) cost.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
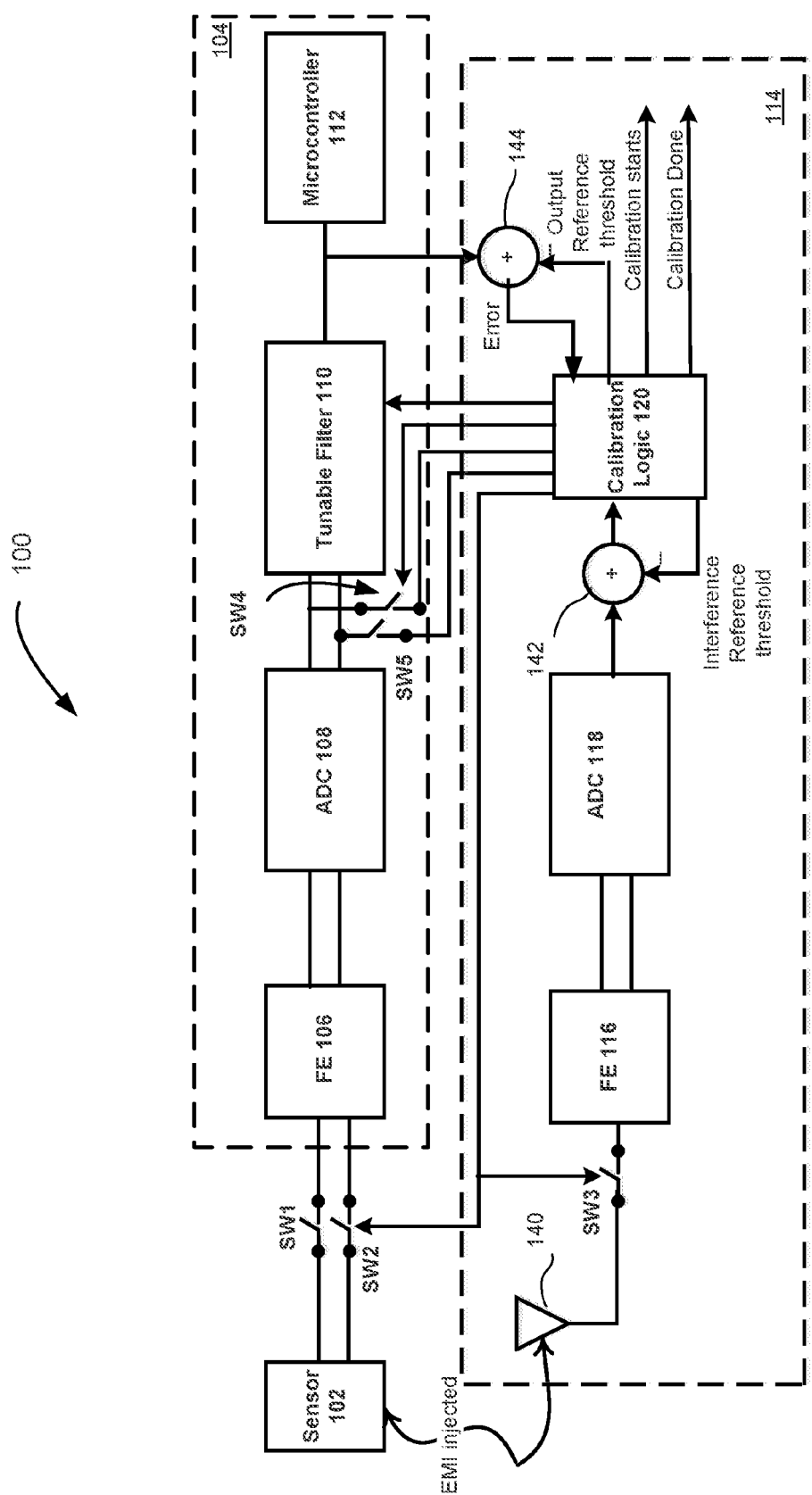
FIG. 1 is a block diagram illustrating an example apparatus configured to mitigate interference in sensor signals, in accordance with some embodiments.

Embodiments of the present disclosure include techniques and configurations for an apparatus and method for mitigating interference in sensor signals. In some embodiments, the apparatus may include one or more sensors and a processing block couplable with the one or more sensors and operable by a controller. The processing block may include a first front end block to receive sensor signals from the one or more sensors, and a tunable filter block coupled with the first front end block, to filter the sensor signals. The apparatus may further include a correction block coupled with the processing block. The correction block may include a second front end block that may comprise a replica of the first front end block and may be configured to receive electromagnetic interference information. The controller may operate the correction block to determine to adjust the tunable filter block, based on the received interference information, and initiate a connection of the one or more sensors with the processing block in response to the adjustment. The controller may also operate the processing block, in response to a connection of the processing block with the one or more sensors, to initiate a receipt, filtering, and processing of the sensor signals filtered by the adjusted tunable filter block, to mitigate interference.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

FIG. 1 is a block diagram illustrating an example apparatus configured to mitigate interference in sensor signals, in accordance with some embodiments. The apparatus 100 may include one or more sensors 102, such as analog sensors. The sensors 102 may be any type of sensors (biosensors, accelerometers, gyroscopes, optical sensors, temperature sensors, inertial measurement units (IMUs) or the like) configured to output signals, e.g., analog output signals. In some embodiments, the sensors may operate in a frequency range from about 100 Hz to about 30 MHz and in signal to interference ratio from about 0 dB to at least −10 dB.

The apparatus 100 may, according to the teaching of the present disclosure, incorporate a number of components to mitigate interference to signals output by sensors 102. In embodiments, the apparatus 100 may further include a processing block 104 couplable with the sensors 102 via switches SW1, SW2. The apparatus 100 may further include a correction block 114 coupled with the processing block 104. In embodiments, the correction block 114 may be configured to receive electromagnetic interference information, and provide initial adjustment of the processing block 104 based on the received interference information (e.g., if the received interference level is above a pre-determined interference threshold), while the processing block 104 is disconnected from the sensors 102. Subsequent to the initial (e.g., coarse) adjustment, the processing block 104 may be connected with the sensors 102 (e.g., by enabling switches SW1, SW2), and may process the sensor signals provided by the sensors 102, with mitigated interference. The processing block 104 may be further adjusted (e.g., fine-tuned), based on the received interference information, to further mitigate interference during the processing of the sensor signals.

The processing block 104 may include a front end block 106 configured to condition optical, electrical, mechanical, or temperature based analog ones of the signals generated by the sensors 102. The front end block 106 may be coupled with an analog-to-digital converter (ADC) 108, configured to convert the conditioned analog signals into a digital form.

The processing block 104 may further include a tunable filter block 110 coupled with the ADC 108 and configured to provide coarse or fine filtering of the digital signal provided by the ADC 108. The tunable filter block 110 may comprise any type of filter, such as an active or passive filter. In embodiments, the tunable filter block 110 may be a digital filter with a pre-determined transfer coefficient.

The processing block 104 may further include a microcontroller 112 coupled with the tunable filter block 110. The microcontroller 112 may be configured to process the filtered sensor signals provided by the tunable filter block 110. The microcontroller 112 may include a processor (not shown) to operate the processing block 104, and a memory (not shown) to store instructions for the processing block 104 operation, as well as the results of the analysis and processing of data received from the sensors. In some embodiments, the memory may store instructions for operation of the correction block 114, which may be executable on the microcontroller processor.

The correction block 114 of the apparatus 100 may include a receiver 140 configured to sense the electromagnetic interference. In embodiments, the receiver 140 may include, for example, an antenna or a capacitive sensor or thin film sensor. The correction block 114 may further include an analog front end block 116 coupled with the receiver 140 via the switch SW3. The analog front end block 116 may substantially model or replicate the front end block 106, and may be responsible for sensing interference received by the receiver 140. In some embodiments, one front end block 116 may be used for all of the sensors (or sensor) 102. In some embodiments, a dedicated front end block 116 may be used for each of the sensors 102. The use of the analog front end block 116 of the front end block 106 in the correction block 114 may allow for replication in the correction block 114 of actual interference that may occur in the processing block 104, in order to provide initial adjustment of the processing block 104. Accordingly, the processing block 104 may not need to be powered on before the electromagnetic interference is detected and a corresponding adjustment of the processing block 104 (e.g., tunable filter block 110) is determined by the correction block 114. The analog front end block 116 may be coupled with an ADC 118, which may comprise a low resolution data converter (e.g., flash converter or successive approximation converter), to convert the received interference signal into a digital format.

The correction block 114 may further include calibration logic 120 that may be coupled with the ADC 118 via comparison logic 142. The calibration logic 120 may comprise a core component of the correction block 114, and may be responsible for initiating coarse and fine adjustment of the tunable filter block 110 of the processing block 104. In embodiments, the calibration logic 120 may be implemented as a state-machine (executable, e.g., on the microcontroller 112) and configured to initiate tunable filter block 110 adjustment, perform comparison of an interference level with a predetermined reference level, and enable or disable switches SW1-SW5. In some embodiments, calibration logic 120 may be embedded in the microcontroller 112. In some embodiments, calibration logic 120 may reside in a memory accessible by the microcontroller 112.

As shown, the calibration logic 120 may be connected to an input of the tunable filter block 110 via switches SW4 and SW5. The calibration logic 120 may be connected to an output of the tunable filter block 110 via comparison logic 144.

The calibration logic 120 may include a periodic counter to enable periodic calibration of the tunable filter block 110 as needed.

In operation, the calibration logic 120 may be configured to enable switch SW3, to provide for a receipt of interference information by the correction block 114 and adjustment of the tunable filter block 110 if necessary. Based on the level of interference (e.g., above a determined interference threshold), the calibration logic 120 may connect with an input of the filter block 110 by enabling switches SW4, and SW5, to initiate the adjustment of the tunable filter block 110. During the tunable filter block 110 adjustment, the calibration logic 120 may keep switches SW1 and SW2 disabled, to have the sensors 102 disconnected from the processing block 104.

The calibration logic 120 may receive interference information from the receiver 140, and perform comparison of an interference signal (e.g., bits) received from the ADC 118 with an interference reference threshold (reference bits), using the comparison logic 142. Based on a result of the comparison, the calibration logic 120 may initiate coarse adjustment of the tunable filter block 110 (e.g., calibration of the filter coefficient). After the adjustment of the tunable filter block 110 has been completed, the calibration logic 120 may connect the sensors 102 with the processing block 104, by enabling SW1 and SW2, to initiate a receipt, filtering, and processing of the sensor signals of the sensors 102 filtered by the tunable filter block 110, thus mitigating interference. The calibration logic 120 may disconnect from the input of the tunable filter block 110 by disabling SW4 and SW5, when the coarse adjustment of the tunable filter block 110 is complete.

During the operation of the processing block 104, the calibration logic 120 may periodically run a fine-tune calibration of the tunable filter block 110. For example, the calibration logic 120 may provide an output reference threshold (which may be different than the interference reference threshold described above) to the comparison logic 142, and receive an error value based on comparison of the output of the tunable filter block 110 with the output reference threshold. Based on a result of this comparison, the calibration logic 120 may determine to further adjust the tunable filter block 110 (e.g., fine-tune the filter coefficient), during the operation of the processing block 104. As described above, the calibration logic 120 may be implemented as a state machine stored in memory and executable on a processor, for example, a processor of the microcontroller 112 or other processor accessible by the apparatus 100. In some embodiments, calibration logic 120 may include comparison logic 142 and 144.

Figure 4:
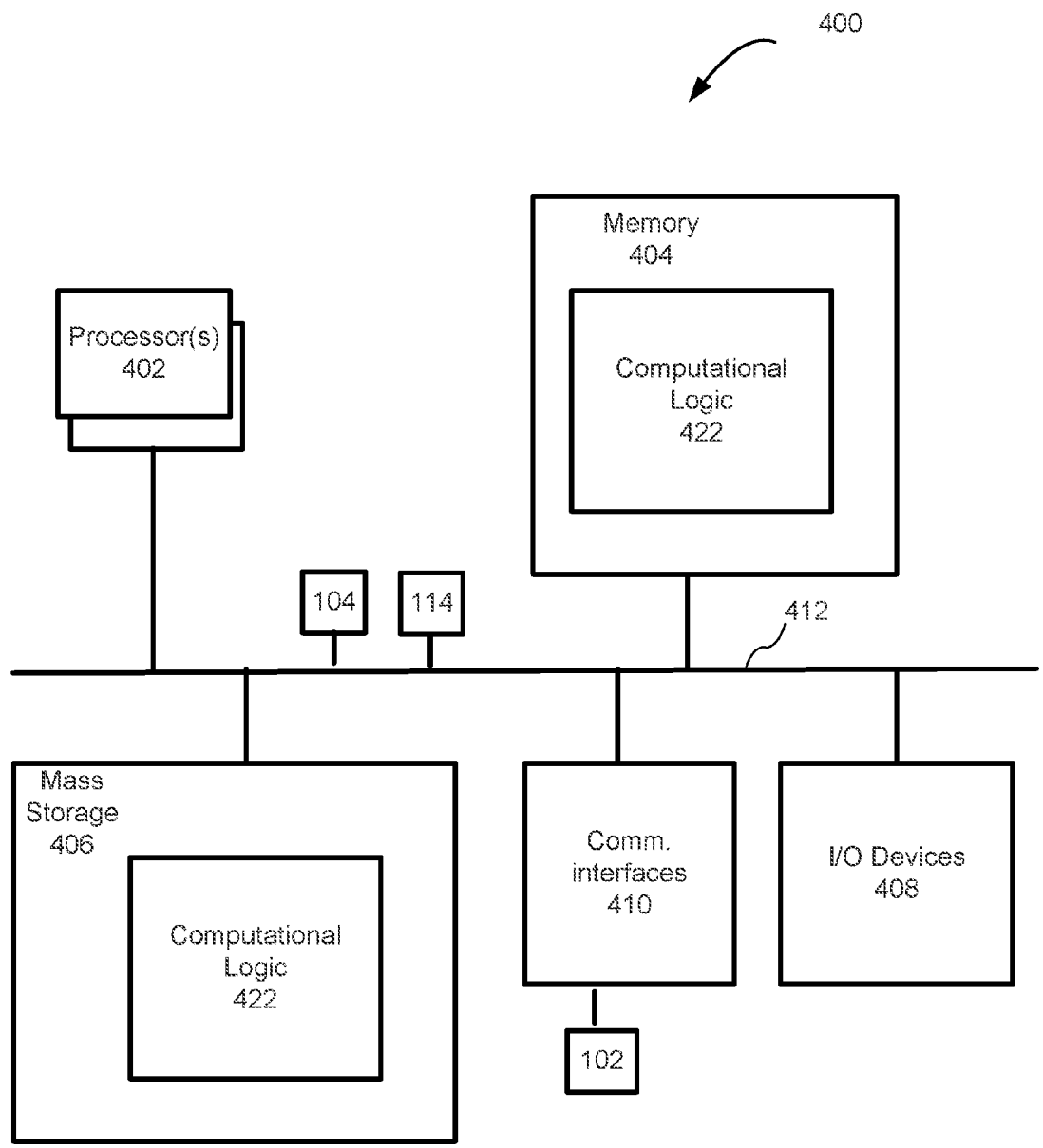
FIG. 4 illustrates an example computing device suitable for use with various components of FIG. 1, in accordance with various embodiments.

Additionally, the apparatus 100 may include different other blocks necessary for functioning of the apparatus, some of which are described in reference to FIG. 4.

In embodiments, the apparatus 100 may be implemented in a die and may be disposed in a printed circuit board (PCB). The apparatus 100 may be disposed in a die in an area approximately 0.05 sq. mm, which may provide for substantial cost savings compared to conventional solutions, which typically involve external circuitry and extra space. Furthermore, the described embodiments provide for power saving because some of the blocks of the apparatus 100 (e.g., processing block 104) may be disconnected and/or powered off during the initial (coarse) calibration of the tunable filter block 110. For example, the correction block 114 may be enabled during a boot phase of the apparatus 100. Further power savings may be provided due to periodic character of calibration of the tunable filter block 110. For example, ADC 118 and/or calibration logic 120 may be powered off and enabled when needed. For another example, during boot, front end blocks 116 and 106, as well as ADC 108 and tunable filter block 110, may be enabled, while microcontroller 112 may be enabled later.

Figure 2:
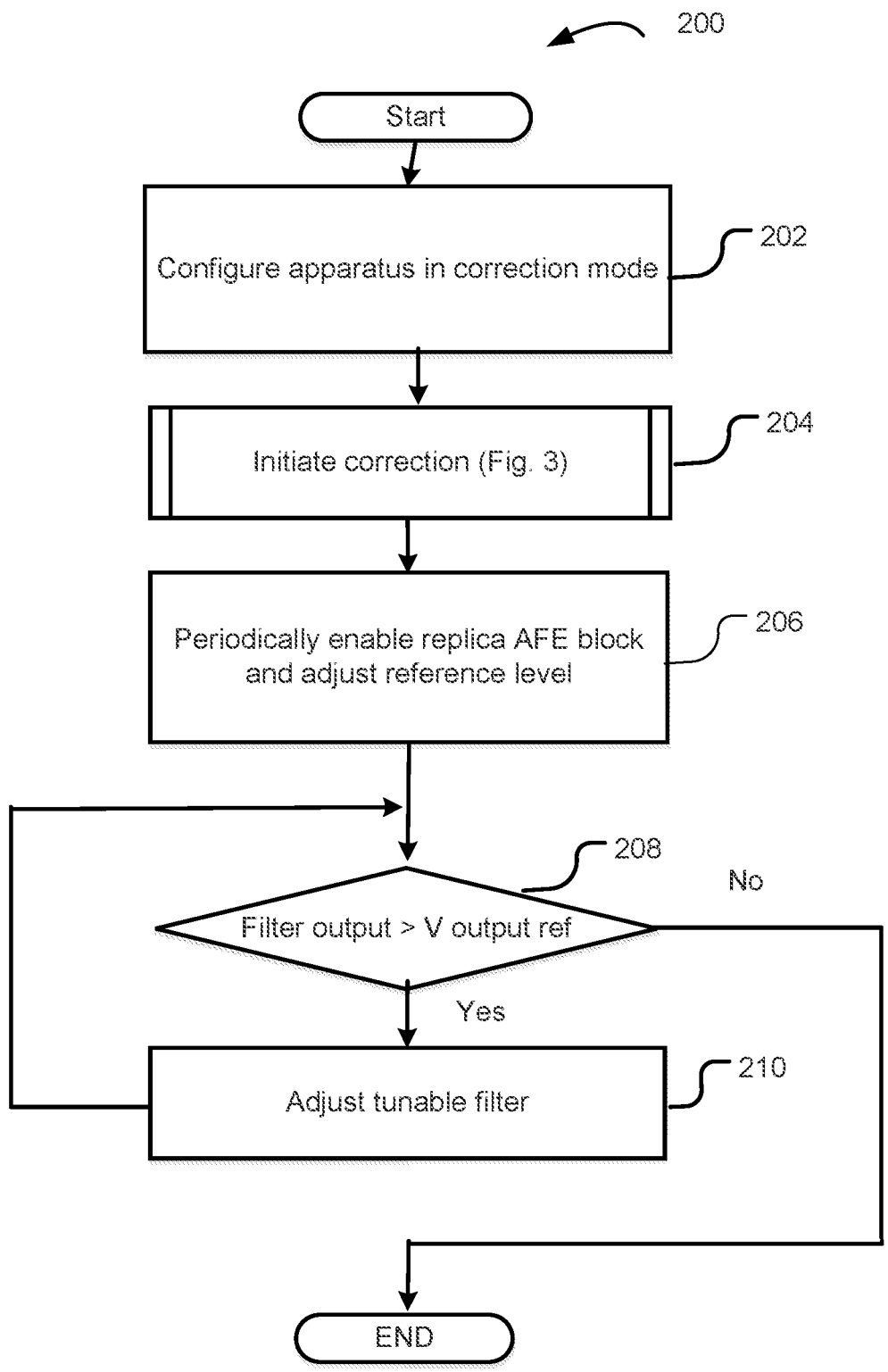
FIG. 2 is an example process flow diagram for mitigating interference in sensor signals, in accordance with some embodiments.

FIG. 2 is an example process flow diagram for mitigating interference in sensor signals, in accordance with some embodiments. The process 200 may comport with the apparatus embodiments described in reference to FIG. 1 and may be performed, for example, by the calibration logic 120 of the apparatus 100. In alternate embodiments, the process 200 may be practiced with more or fewer operations, or a different order of the operations.

The process 200 may begin at block 202 and include configuring an apparatus for mitigating interference in sensor signals (e.g., apparatus 100) in a correction mode. For example, the apparatus may be booted (powered on). In the initial state of the apparatus 100, switch SW3 may be enabled, to provide for a reception of interference information by the front end block 116 of the correction block 114 of the apparatus 100. In some embodiments, switches SW4 and SW5 may be enabled, to provide for adjustment of the tunable filter block 110.

At block 204, the process 200 may include determining to initiate adjustment of the tunable filter block 110, based on the received interference information. As noted above, such adjustment may comprise a coarse adjustment of the filter block 110, prior to receiving and processing sensor signals by the processing block 104. The adjustment routine of block 204 is described in detail in reference to FIG. 3.

At block 206, the process 200 may include providing an output reference threshold for the tunable filter block 110. For example, the replica front end block 116 may be periodically enabled, and the output reference threshold may check the reference level of interference. When a reference level is known, calibration logic 120 may adjust the tunable filter block 110. The reference level may be adjusted, for example, based on a desired signal to interference noise ratio and may be programmable.

At decision block 208 it may be determined whether the output of the tunable filter block 110 is higher than the output reference threshold. If it is determined the output of the tunable filter block 110 is higher than the output reference threshold (in terms of signal to noise ratio or in terms of fast Fourier transform (FFT)), the tunable filter block 110 may be adjusted at block 210 and the process may return to decision block 208. The actions of blocks 208 and 210 may be repeated until it may be determined that the output of the tunable filter block 110 is equal to or lower than the output reference threshold.

Figure 3:
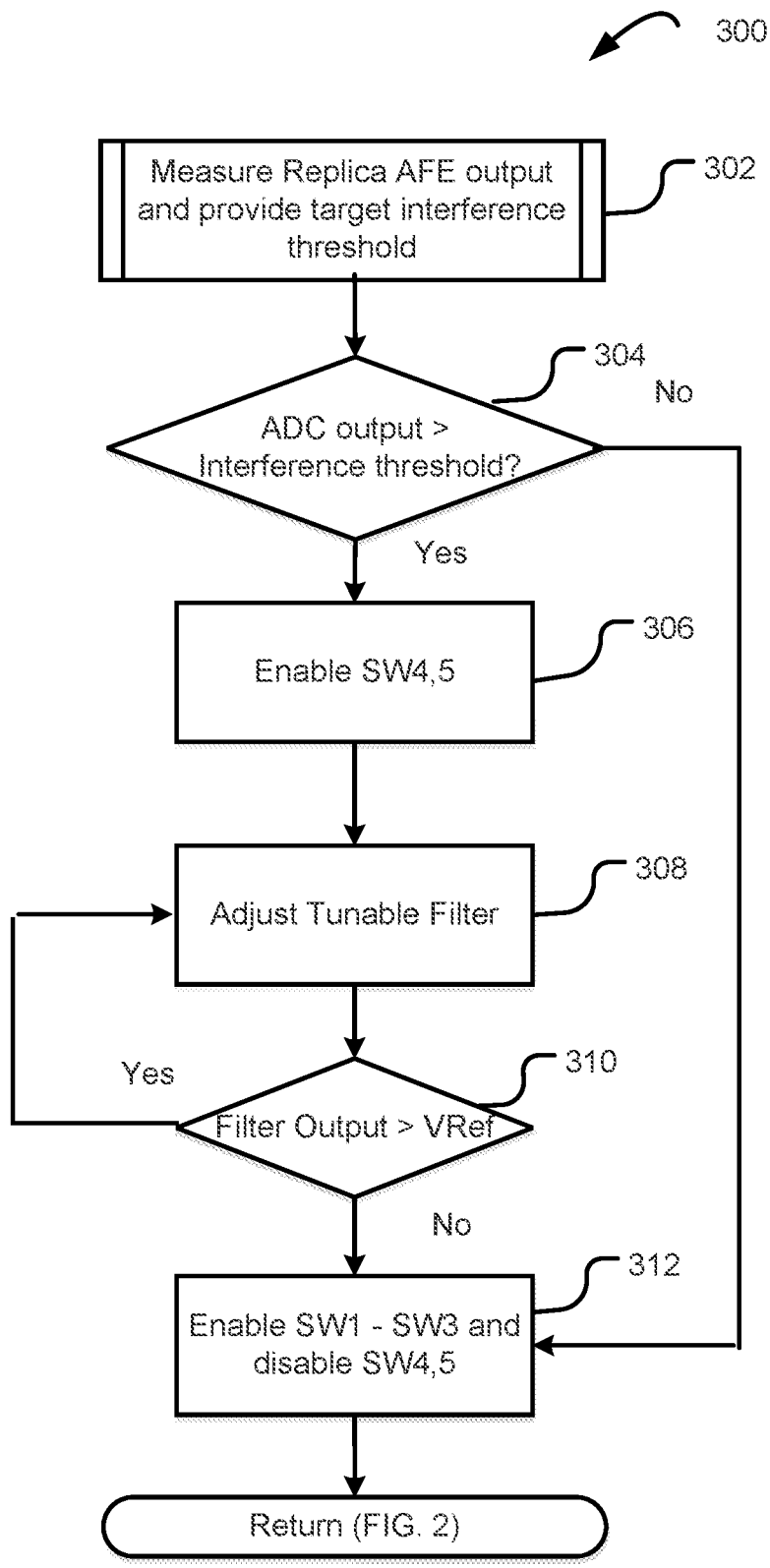
FIG. 3 is another example process flow diagram for mitigating interference in sensor signals, in accordance with some embodiments.

FIG. 3 is another example process flow diagram for mitigating interference in sensor signals, in accordance with some embodiments. The process 300 may comport with the apparatus embodiments described in reference to FIG. 1 and may be performed, for example, by the calibration logic 120 of the apparatus 100. In alternate embodiments, the process 300 may be practiced with more or fewer operations, or a different order of the operations. The process 300 may describe a fine filter block adjustment routine referenced as block 204 in FIG. 2.

The process 300 may begin at block 302 and include measuring replica front end 116 output and providing a target interference threshold for the apparatus 100. If output of ADC 118 is higher than signal to interference ratio, then switches 4, 5 may be enabled (e.g., information of some sensing data may be available).

At decision block 304 it may be determined whether interference level (ADC 118 output) at the front end block 116 is above a determined interference threshold. If it is determined that the interference level is equal to or below the determined interference threshold, no tunable filter block 110 adjustment may be needed. Accordingly, the process 300 may move to block 312, at which switches SW1-SW3 may be enabled to provide for receipt and processing of the sensor signals. Switches SW4 and SW5 may be disabled (if SW4 and SW5 were enabled prior to this action), to disconnect the calibration logic 120 from the input of the tunable filter block 110.

If it is determined that the interference level is above the determined interference threshold, it may be concluded that the tunable filter block 110 adjustment may be needed. Accordingly, at block 306, switches SW4 and SW5 may be enabled, to provide for adjustment of the tunable filter block 110.

At block 308, the tunable filter block 110 (e.g., filter coefficient) may be adjusted, based on the interference level provided to the front end block 116, and the tunable filter block 110 output. The interference level may be a reference level, such as a signal to noise ratio (SNR) calculated based on digital bits by calibration logic 120. Comparison of tunable filter output may be based on SNR of tunable filter output. If output is higher than desired SNR, correction may be needed, or else calibration may be complete, as described in reference to block 310.

At decision block 310 it may be determined whether the output of the tunable filter block 110 is higher than the output reference threshold. If it is determined the output of the tunable filter block 110 is higher than the output reference threshold, the tunable filter block 110 may be adjusted at block 308 and the process may return to decision block 308. The actions of blocks 308 and 310 may be repeated until it may be determined that the output of the tunable filter block 110 is equal to or lower than the output reference threshold and the process 300 may move to block 312 as described above.

FIG. 4 illustrates an example computing device 400 suitable for use with various components of FIG. 1, in accordance with various embodiments. In some embodiments, various components of the example computing device 400 may be used to configure the apparatus 100. As shown, computing device 400 may include one or more processors 402, each having one or more processor cores, and system memory 404. The processor 402 may include any type of uni- or multi-core processors.

The processor 402 may be implemented as an integrated circuit. For example, the processor 402 may comprise one or more processing cores embodied in a component (e.g., in a System-on-a-Chip (SoC) configuration), and any processor-related support circuitry (e.g., bridging interfaces, etc.). Example processors may include, but are not limited to, various microprocessors including those in the Pentium®, Xeon®, Itanium®, Celeron®, Atom®, Quark®, Core® product families, or the like. Examples of support circuitry may include host side or input/output (I/O) side chipsets (also known as northbridge and southbridge chipsets/components) to provide an interface through which the processor may interact with other system components that may be operating at different speeds, on different buses, etc. in the apparatus 100. Some or all of the functionality commonly associated with the support circuitry may also be included in the same physical package as the processor.

The computing device 400 may include mass storage devices 406 (such as solid state drives, volatile memory (e.g., dynamic random-access memory (DRAM)), and so forth). In general, system memory 404 and/or mass storage devices 406 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth. System memory 404 and/or mass storage devices 406 may include respective copies of programming instructions configured to perform operations related to apparatus 100 (e.g., calibration logic 120), for example, collectively denoted as computational logic 422.

The computing device 400 may further include input/output (I/O) devices 408 (such as a display, soft keyboard, touch sensitive screen, image capture device, and so forth) and communication interfaces 410 (such as network interface cards, modems, infrared receivers, radio receivers (e.g., Near Field Communication (NFC), Bluetooth, WiFi, 4G/5G Long-Term Evolution (LTE)), and so forth).

The communication interfaces 410 may include communication chips (not shown) that may be configured to operate the device 400 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 410 may operate in accordance with other wireless protocols in other embodiments.

In embodiments, the computing device 400 may comprise the apparatus 100 of FIG. 1. In some embodiments, the device 400 may include sensors 102, the processing block 104, and correction block 114 as described herein.

The above-described computing device 400 elements may be coupled to each other via system bus 412, which may represent one or more buses. In the case of multiple buses, they may be bridged by one or more bus bridges (not shown). Each of these elements may perform its conventional functions known in the art. In particular, system memory 404 and mass storage devices 406 may be employed to store a working copy and a permanent copy of the programming instructions implementing the operations associated with the apparatus 100 of FIG. 1, collectively referred to as computational logic 422. Computational logic 422 may be implemented by assembler instructions supported by processor(s) 402 or high-level languages that may be compiled into such instructions.

The permanent copy of the programming instructions of computational logic 422 may be placed into permanent storage devices 406 in the factory, or in the field through, for example, a distribution medium (not shown), or through communication interfaces 410 (from a distribution server (not shown)). That is, one or more non-transitory distribution media having an implementation of the agent program may be employed to distribute the agent and to program various computing devices. In embodiments, the distribution media may be transitory, e.g., signals encoded with the instructions.

The number, capability, and/or capacity of the elements 408, 410, 412 may vary, depending on whether computing device 400 is used as a stationary computing device, such as a set-top box or desktop computer, or a mobile computing device, such as a tablet computing device, laptop computer, game console, or smartphone. Their constitutions are otherwise known, and accordingly will not be further described.

At least one of processors 402 may be packaged together with memory having computational logic 422 configured to practice aspects of embodiments described in reference to FIGS. 1-4. For one embodiment, at least one of processors 402 may be packaged together with memory having computational logic 422 to form a System in Package (SiP) or a SoC. For at least one embodiment, the SoC may be utilized in, e.g., but not limited to, the apparatus 100 of FIG. 1.

In various implementations, the computing device 400 may comprise a mobile device, a wearable device, a laptop, a smartphone, a tablet computer, a game console, a netbook, a notebook, an ultrabook, or an ultra mobile PC.

The following paragraphs describe examples of various embodiments.

Example 1 may be an apparatus for interference mitigation, comprising: one or more sensors; a processing block couplable with the one or more sensors and operable by a controller, wherein the processing block includes a first front end block to receive sensor signals from the one or more sensors, and a tunable filter block coupled with the first front end block, to filter the sensor signals. The apparatus may also include a correction block coupled with the processing block, wherein the correction block includes a second front end block that comprises a replica of the first front end block and is to receive interference information, wherein the controller is to operate the correction block to determine to adjust the tunable filter block, based on the received interference information, and initiate a connection of the one or more sensors with the processing block in response to the adjustment, wherein the controller is to operate the processing block, in response to a connection of the processing block with the one or more sensors, to initiate a receipt, filtering, and processing of the sensor signals filtered by the adjusted tunable filter block, to mitigate interference.

Example 2 may include the subject matter of Example 1, wherein the one or more sensors comprise analog sensors, wherein the correction block further includes a calibration logic coupled with the second front end block, wherein the controller is to operate the correction block to connect the calibration logic to an input of the tunable filter block, to initiate an adjustment of the tunable filter block.

Example 3 may include the subject matter of Example 2, wherein the calibration logic is embedded in the controller.

Example 4 may include the subject matter of Example 2, wherein the controller is to operate the correction block to connect the calibration logic to the input of the tunable filter block in response to a determination that an interference level at the second front end block is above a determined threshold.

Example 5 may include the subject matter of Example 2, wherein the controller is to operate the correction block to disconnect the calibration logic from the input of the tunable filter block, in response to the adjustment of the tunable filter block, and to initiate the receipt, filtering, and processing of the sensor signals filtered by the tunable filter block.

Example 6 may include the subject matter of Example 5, wherein the adjustment of the tunable filter block is a first adjustment, wherein the calibration logic is coupled with an output of the tunable filter block, wherein the controller is to operate the calibration logic to determine whether to perform a second adjustment of the tunable filter block, based at least in part on tunable filter block output information and the received interference information.

Example 7 may include the subject matter of Example 1, wherein the controller is to operate the correction block to poll the second front end block periodically, to receive the interference information, and to initiate the determination to adjust the tunable filter block.

Example 8 may include the subject matter of Example 1, wherein the correction block further includes a receiver coupled with second front end block to sense the interference information, wherein the receiver includes one of: an antenna or a capacitive sensor.

Example 9 may include the subject matter of Example 2, wherein the first and second front end blocks comprise a receiver chain or signal chain amplifier, wherein the processing block includes a first analog to digital converter (ADC) coupled with the first front end block and the tunable filter block, wherein the correction block includes a second analog to digital converter (ADC) coupled with the second front end block and the calibration logic.

Example 10 may include the subject matter of Example 9, wherein the tunable filter block comprises one of: a passive filter or an active filter.

Example 11 may include the subject matter of Example 9, wherein the correction block includes a first comparison logic, wherein the second ADC is coupled with the calibration logic via the first comparison logic, wherein the first comparison logic is to compare an interference level at the second front end block with a determined threshold.

Example 12 may include the subject matter of Example 11, wherein the correction block includes a second comparison logic, wherein the calibration logic is coupled with an output of the tunable filter block via the second comparison logic, wherein the second comparison logic is to compare filter output information with a reference threshold.

Example 13 may include the subject matter of Example 12, wherein the calibration logic includes the first and second comparison logics.

Example 14 may include the subject matter of any Examples 1 to 11, wherein the apparatus comprises one of: a wearable device, a laptop, a smartphone, a tablet computer, or a game console.

Example 15 may be a controller-implemented method for mitigating interference to sensor signals in an apparatus, comprising: receiving, by a controller, interference information, including causing a front end block of a correction block of the apparatus to receive the interference information, wherein the front end block of the correction block models or replicates a front end block of a processing block of the apparatus, wherein the processing block is connectable with one or more sensors to receive sensor signals; determining, by the controller, to adjust a tunable filter block of the apparatus, based on the received interference information, wherein the processing block is disconnected from the one or more sensors; and initiating, by the controller, a connection between the one or more sensors and the processing block in response to adjusting the tunable filter block, to provide receiving, filtering, and processing of the sensor signals filtered by the adjusted tunable filter block, to mitigate interference.

Example 16 may include the subject matter of Example 15, further comprising: initiating, by the controller, receiving, filtering, and processing of the sensor signals filtered by the tunable filter block, after the initiating the connection between the one or more sensors and the processing block.

Example 17 may include the subject matter of Example 16, further comprising: determining, by the controller, whether to further adjust the tunable filter block, based at least in part on tunable filter block output information and the received interference information, during receiving, filtering, and processing of the sensor signals filtered by the adjusted tunable filter block.

Example 18 may be one or more non-transitory apparatus-readable storage media having instructions stored thereon for mitigating interference to sensor signals, which, in response to execution by an apparatus, cause the apparatus to: receive interference information, with a front end block of a correction block of the apparatus, wherein the front end block of the correction block models or replicates a front end block of a processing block of the apparatus, wherein the processing block is connectable with one or more sensors to receive sensor signals; determine to adjust a tunable filter block of the apparatus, based on the received interference information, wherein the processing block is disconnected from the one or more sensors; and initiate a connection between the one or more sensors and the processing block in response to the adjustment of the tunable filter block, to provide a receipt, filtering, and processing of the sensor signals filtered by the adjusted tunable filter block, to mitigate interference.

Example 19 may include the subject matter of Example 18, wherein the instructions further cause the apparatus to initiate a receipt, filtering, and processing of the sensor signals filtered by the tunable filter block, after the initiation of the connection between the one or more sensors and the processing block.

Example 20 may include the subject matter of Example 19, wherein the instructions further cause the apparatus to determine whether to further adjust the tunable filter block, based at least in part on tunable filter block output information and the received interference information, during the receipt, filtering, and processing of the sensor signals filtered by the adjusted tunable filter block.

Example 21 may include the subject matter of Example 18, wherein the instructions further cause the apparatus to cause a disconnection of a calibration logic of the correction block from an input of the tunable filter block, in response to the adjustment of the tunable filter block.

Example 22 may include the subject matter of Example 21, wherein the instructions further cause the apparatus to poll the front end block of the correction block periodically, to receive the interference information, and to initiate the determination to adjust the tunable filter block.

Example 23 may be an apparatus for mitigating interference to sensor signals in an apparatus, comprising: means for receiving interference information, including causing a front end block of a correction block of the apparatus to receive the interference information, wherein the front end block of the correction block models or replicates a front end block of a processing block of the apparatus, wherein the processing block is connectable with one or more sensors to receive sensor signals; means for determining to adjust a tunable filter block of the apparatus, based on the received interference information, wherein the processing block is disconnected from the one or more sensors; and means for initiating a connection between the one or more sensors and the processing block in response to adjusting the tunable filter block, to provide receiving, filtering, and processing of the sensor signals filtered by the adjusted tunable filter block, to mitigate interference.

Example 24 may include the subject matter of Example 23, further comprising: means for initiating receiving, filtering, and processing of the sensor signals filtered by the tunable filter block, after the initiating the connection between the one or more sensors and the processing block.

Example 25 may include the subject matter of Example 24, further comprising: means for determining whether to further adjust the tunable filter block, based at least in part on tunable filter block output information and the received interference information, during receiving, filtering, and processing of the sensor signals filtered by the adjusted tunable filter block.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus, comprising:
one or more sensors;
a processing block couplable with the one or more sensors and operable by a controller, wherein the processing block includes a first front end block to receive sensor signals from the one or more sensors, and a tunable filter block coupled with the first front end block, to filter the sensor signals; and
a correction block coupled with the processing block, wherein the correction block includes a second front end block that comprises a replica of the first front end block and is to receive interference information,
wherein the controller is to operate the correction block to determine to adjust the tunable filter block, based on the received interference information, and initiate a connection of the one or more sensors with the processing block in response to the adjustment, wherein the controller is to operate the processing block, in response to a connection of the processing block with the one or more sensors, to initiate a receipt, filtering, and processing of the sensor signals filtered by the adjusted tunable filter block, to mitigate interference.

2. The apparatus of claim 1, wherein the one or more sensors comprise analog sensors, wherein the correction block further includes a calibration logic coupled with the second front end block, wherein the controller is to operate the correction block to connect the calibration logic to an input of the tunable filter block, to initiate an adjustment of the tunable filter block.

3. The apparatus of claim 2, wherein the calibration logic is embedded in the controller.

4. The apparatus of claim 2, wherein the controller is to operate the correction block to connect the calibration logic to the input of the tunable filter block in response to a determination that an interference level at the second front end block is above a determined threshold.

5. The apparatus of claim 2, wherein the controller is to operate the correction block to disconnect the calibration logic from the input of the tunable filter block, in response to the adjustment of the tunable filter block, and to initiate the receipt, filtering, and processing of the sensor signals filtered by the tunable filter block.

6. The apparatus of claim 5, wherein the adjustment of the tunable filter block is a first adjustment, wherein the calibration logic is coupled with an output of the tunable filter block, wherein the controller is to operate the calibration logic to determine whether to perform a second adjustment of the tunable filter block, based at least in part on tunable filter block output information and the received interference information.

7. The apparatus of claim 1, wherein the correction block further includes a receiver coupled with second front end block to sense the interference information, wherein the receiver includes one of: an antenna or a capacitive sensor.

8. The apparatus of claim 2, wherein the first and second front end blocks comprise a receiver chain or signal chain amplifier, wherein the processing block includes a first analog to digital converter (ADC) coupled with the first front end block and the tunable filter block, wherein the correction block includes a second analog to digital converter (ADC) coupled with the second front end block and the calibration logic.

9. The apparatus of claim 8, wherein the tunable filter block comprises one of: a passive filter or an active filter.

10. The apparatus of claim 8, wherein the correction block includes a first comparison logic, wherein the second ADC is coupled with the calibration logic via the first comparison logic, wherein the first comparison logic is to compare an interference level at the second front end block with a determined threshold.

11. The apparatus of claim 10, wherein the correction block includes a second comparison logic, wherein the calibration logic is coupled with an output of the tunable filter block via the second comparison logic, wherein the second comparison logic is to compare filter output information with a reference threshold.

12. The apparatus of claim 11, wherein the calibration logic includes the first and second comparison logics.

13. The apparatus of claim 1, wherein the controller is to operate the correction block to poll the second front end block periodically, to receive the interference information, and to initiate the determination to adjust the tunable filter block.

14. The apparatus of claim 1, wherein the apparatus comprises one of: a wearable device, a laptop, a smartphone, a tablet computer, or a game console.

15. A controller-implemented method for mitigating interference to sensor signals in an apparatus, comprising:
 receiving, by a controller, interference information, including causing a front end block of a correction block of the apparatus to receive the interference information, wherein the front end block of the correction block models or replicates a front end block of a processing block of the apparatus, wherein the processing block is connectable with one or more sensors to receive sensor signals;
 determining, by the controller, to adjust a tunable filter block of the apparatus, based on the received interference information, wherein the processing block is disconnected from the one or more sensors; and
 initiating, by the controller, a connection between the one or more sensors and the processing block in response to adjusting the tunable filter block, to provide receiving, filtering, and processing of the sensor signals filtered by the adjusted tunable filter block, to mitigate interference.

16. The controller-implemented method of claim 15, further comprising:
 initiating, by the controller, receiving, filtering, and processing of the sensor signals filtered by the tunable filter block, after the initiating the connection between the one or more sensors and the processing block.

17. The controller-implemented method of claim 16, further comprising:
 determining, by the controller, whether to further adjust the tunable filter block, based at least in part on tunable filter block output information and the received interference information, during receiving, filtering, and processing of the sensor signals filtered by the adjusted tunable filter block.

18. One or more non-transitory apparatus-readable storage media having instructions stored thereon for mitigating interference to sensor signals, which, in response to execution by an apparatus, cause the apparatus to:
 receive interference information, with a front end block of a correction block of the apparatus, wherein the front end block of the correction block models or replicates a front end block of a processing block of the apparatus, wherein the processing block is connectable with one or more sensors to receive sensor signals;
 determine to adjust a tunable filter block of the apparatus, based on the received interference information, wherein the processing block is disconnected from the one or more sensors; and
 initiate a connection between the one or more sensors and the processing block in response to the adjustment of the tunable filter block, to provide a receipt, filtering, and processing of the sensor signals filtered by the adjusted tunable filter block, to mitigate interference.

19. The apparatus-readable storage media of claim 18, wherein the instructions further cause the apparatus to initiate a receipt, filtering, and processing of the sensor signals filtered by the tunable filter block, after the initiation of the connection between the one or more sensors and the processing block.

20. The apparatus-readable storage media of claim 19, wherein the instructions further cause the apparatus to determine whether to further adjust the tunable filter block, based at least in part on tunable filter block output information and the received interference information, during the receipt, filtering, and processing of the sensor signals filtered by the adjusted tunable filter block.

21. The apparatus-readable storage media of claim 18, wherein the instructions further cause the apparatus to cause a disconnection of a calibration logic of the correction block from an input of the tunable filter block, in response to the adjustment of the tunable filter block.

22. The apparatus-readable storage media of claim 21, wherein the instructions further cause the apparatus to poll the front end block of the correction block periodically, to receive the interference information, and to initiate the determination to adjust the tunable filter block.

* * * * *

UNITED STATES PATENT AND TRADEMARK OFFICE
CERTIFICATE OF CORRECTION

PATENT NO.        : 9,628,124 B1
APPLICATION NO.   : 15/239742
DATED             : April 18, 2017
INVENTOR(S)       : Amit Kumar Srivastava Page 1 of 1

It is certified that error appears in the above-identified patent and that said Letters Patent is hereby corrected as shown below:

Column 12
Line 46, "...with second..." should read – "...with the second..."

Signed and Sealed this
Twenty-first Day of August, 2018

Andrei Iancu
*Director of the United States Patent and Trademark Office*